United States Patent
Quilty et al.

(10) Patent No.: US 8,406,146 B2
(45) Date of Patent: Mar. 26, 2013

(54) SCRAMBLING CODE ALLOCATION IN A CELLULAR COMMUNICATION NETWORK

(75) Inventors: John Quilty, Athlone (IE); Anna Pucar Rimhagen, Motala (SE); Johan Moe, Mantorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 466 days.

(21) Appl. No.: 12/809,840

(22) PCT Filed: Dec. 21, 2007

(86) PCT No.: PCT/SE2007/051071
§ 371 (c)(1),
(2), (4) Date: Jun. 21, 2010

(87) PCT Pub. No.: WO2009/082307
PCT Pub. Date: Jul. 2, 2009

(65) Prior Publication Data
US 2010/0272070 A1    Oct. 28, 2010

(51) Int. Cl.
H04J 1/16     (2006.01)
H04W 4/00     (2009.01)
H04B 7/216    (2006.01)
H04W 72/00    (2009.01)

(52) U.S. Cl. ......... 370/252; 370/329; 370/342; 455/450

(58) Field of Classification Search .................. None
See application file for complete search history.

(56) References Cited

U.S. PATENT DOCUMENTS

| | | | | |
|---|---|---|---|---|
| 7,417,975 B2* | 8/2008 | Takano et al. | .............. | 370/335 |
| 8,014,362 B2* | 9/2011 | Panico et al. | .............. | 370/335 |
| 2006/0172707 A1 | 8/2006 | Stern-Berkowitz et al. | | |
| 2008/0188265 A1* | 8/2008 | Carter et al. | .............. | 455/561 |

FOREIGN PATENT DOCUMENTS

| | | |
|---|---|---|
| EP | 1 657 950 | 5/2006 |
| WO | WO 2008/020969 | 2/2008 |

OTHER PUBLICATIONS

International Search Report for PCT/SE2007/051071, mailed Oct. 30, 2008.
International Preliminary Report on Patentability for PCT/SE2007/051071, presented in the PCT Application on Oct. 16, 2009, with 5 Amended Sheets.

* cited by examiner

*Primary Examiner* — Faruk Hamza
*Assistant Examiner* — Cassandra Decker
(74) *Attorney, Agent, or Firm* — Nixon & Vanderhye P.C.

(57) ABSTRACT

In a cellular wireless communications network, measurements are received from a plurality of user equipments relating to the reference signal received powers from a plurality of other cells of the cellular wireless communications network For other cells of the cellular wireless communications network having a physical cell identity (such as a scrambling code) that is the same as a physical cell identity of that first cell, it is determined from the received measurements whether a mutual potential interference level with that cell exceeds a threshold If so, an alternative physical cell identity is proposed, that would cause a mutual potential interference level between the cell or the potentially interfering cell and another cell already using that alternative physical cell identity that is lower than the mutual potential interference level between the cell and the potentially interfering cell.

14 Claims, 3 Drawing Sheets

SCRAMBLING CODE ALLOCATION IN A CELLULAR COMMUNICATION NETWORK

This application is the U.S. National Phase of International Application No. PCT/SE2007/051071 filed 21 Dec. 2007, which designated the U.S., the entire contents of each of which are hereby incorporated by reference.

BACKGROUND

This invention relates to a method of monitoring a cellular communication network, and in particular to a method of detecting a possibility of interference between cells of the network. In addition, the invention relates to a management node in the cellular communication network.

In a cellular network, it is well known that there is a risk of interference between neighbouring cells that transmit on the same frequency or frequencies. It is also known that cells transmitting on the same frequency can identify their transmissions by encoding their transmissions with physical cell identities such as scrambling codes. A user device that is active within the cell can then detect the transmissions intended for it by detecting transmissions that have been encoded with the specified scrambling code or other physical cell identity.

SUMMARY OF THE INVENTION

According to a first aspect of the invention, there is provided a method of operation of a cellular wireless communications network, the method comprising, in respect of a cell of the cellular wireless communications network:

receiving measurements from a plurality of user equipments relating to the reference signal received powers from a plurality of other cells of the cellular wireless communications network;

for a plurality of said other cells of the cellular wireless communications network having a physical cell identity that is the same as a physical cell identity of said cell, determining based on said received measurements whether a mutual potential interference level with said cell exceeds a threshold; and in the event that the mutual potential interference level between the cell and a potentially interfering cell exceeds a threshold:

for at least one of the cell and the potentially interfering cell, generating a list of physical cell identities available in the cellular wireless communications network; and identifying an alternative physical cell identity that would cause a mutual potential interference level between the cell or the potentially interfering cell and another cell already using that alternative physical cell identity that is lower than the mutual potential interference level between the cell and the potentially interfering cell.

This has the advantage that the planning of the scrambling codes, or other physical cell identities, can be performed in a proactive way.

DETAILED DESCRIPTION OF PREFERRED EMBODIMENTS

Figure 1:
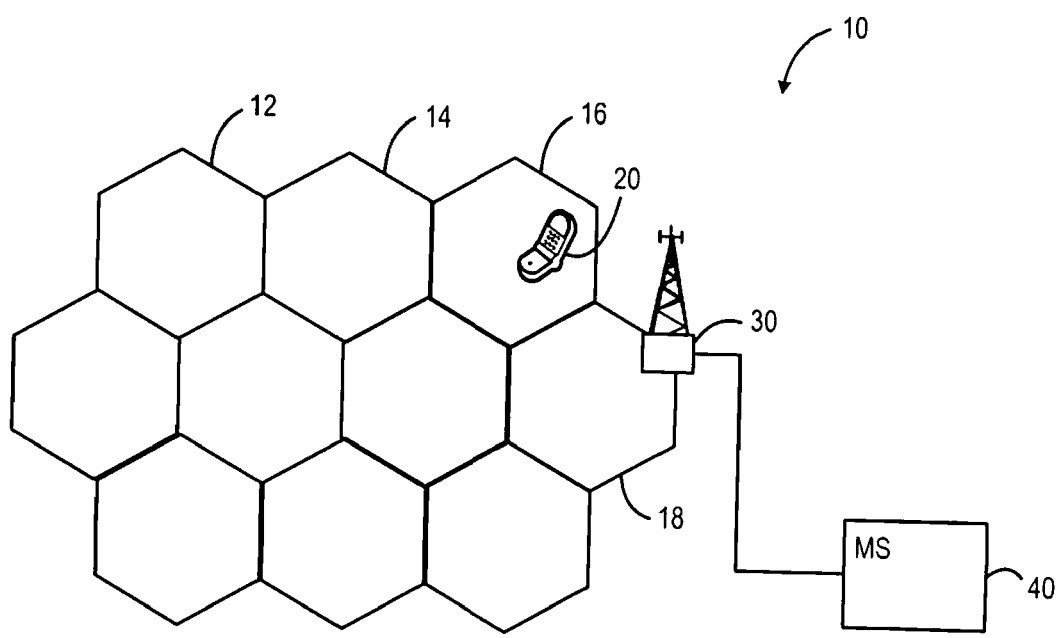
FIG. 1 is a schematic diagram of a part of a cellular communications network in accordance with an aspect of the invention.

FIG. 1 illustrates a part of a cellular communications network 10. In this illustrated embodiment of the invention, the network 10 operates using WCDMA, aspects of which will be described in more detail below to the extent that they are relevant for an understanding of the invention. In the network 10, the coverage area is divided into cells 12, 14, 16, 18, etc. Of course, a practical network will likely contain a large number of such cells.

FIG. 1 shows a user equipment 20 in the form of a mobile phone, simply for the purposes of illustration. It will be appreciated that, in practice, there are likely to be a large number of user devices, in the form of voice and data devices active within the coverage area of the network at any one time. As is well known, the user equipment may be able to move within the coverage area, and in particular may be able to move from one cell to another. At any one time, there will be one particular cell, the serving cell, that is able to transmit signals to the user equipment, although the user equipment will also be able to detect signals transmitted in other cells. As is also well known, the user equipment may be instructed to make signal strength measurements on the signals that it receives, from its serving cells and from other cells, and to report the results to its serving cell.

As is further known, the signals for transmission within each cell of the network are controlled by a respective Node B, although each Node B may serve more than one cell. FIG. 1 shows a Node B 30 that serves the cell 18, but may also serve other cells. Moreover, a UE within one cell may be able to receive transmissions from more than one cell. In general, it will be understood that FIG. 1 greatly simplifies the network architecture, showing only those network elements that are required for an understanding of the present invention.

The operation of the network is controlled by a management system (MS) 40. Of particular relevance for an understanding of this invention, the management system 40 allocates scrambling codes to the cells 12, 14, 16, 18, etc, so that transmissions from a cell can be distinguished from each other cell, even when those transmissions are on the same frequency as the transmissions from another cell. The operation of the management system 40 may be generally conventional, in terms of the specific mechanisms that it uses for communication with the various Node Bs, and for controlling the operation of the Node Bs.

For example, the management system 40 may be connected directly to each Node B, such as the Node B 30, or may be indirectly connected. The management system may be contained within a single network node, or distributed over many such nodes. The relevant part of the function may for example be performed in a node such as an Operational Support System (OSS).

Figure 2:
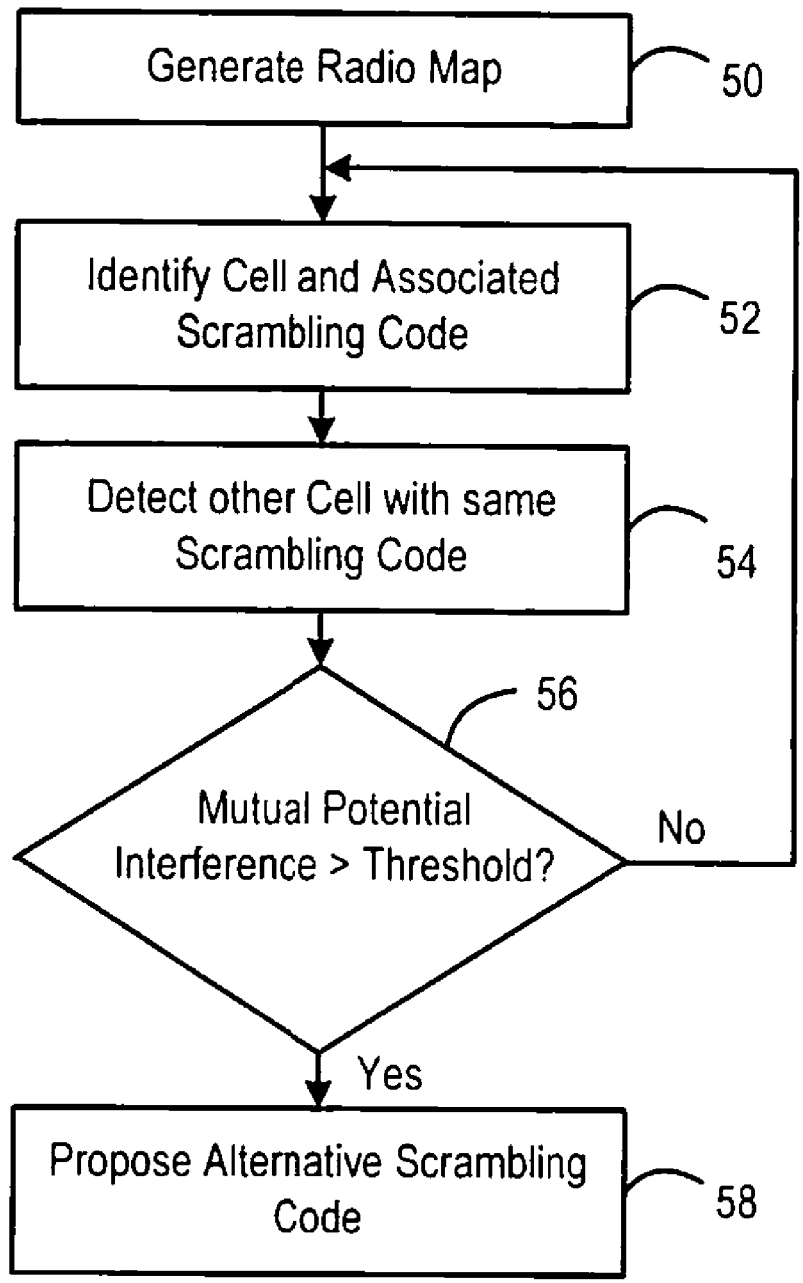
FIG. 2 is a flow chart illustrating a method in accordance with an aspect of the invention.

FIG. 2 is a flow chart, illustrating a method performed in accordance with an aspect of the invention, for determining which scrambling codes may be allocated to particular cells, from a range of available scrambling codes. The steps of the method shown in FIG. 2 are thus originated in the management system 40, although they rely on inputs from the Node Bs and elsewhere.

Although the particular embodiment of the invention described here in detail relates to a WCDMA network, in which scrambling codes are used to identify transmissions in different cells, the invention is also applicable to other types of network using different physical cell identities. For example, in the case of a GSM network, the relevant physical cell identity may be the Base Station Identity Code (BSIC). while, in the case of an LTE E-UTRAN network of the type being specified under 3GPP, the relevant cell identity may be the measured cell identity.

In step 50, a radio map is generated. The radio map contains information about the relationships amongst all of the cells. However, of particular relevance to this invention is the application of the radio map to determining the relationship between one particular cell and the other cells of the network.

A radio map describes the potential downlink interference between all pairs of cells. The element of the A:th row and B:th column in the matrix gives the percentage of mobiles in cell A, which would be significantly interfered with, if the same or an adjacent channel were used in cell B. The values are estimated from the UEs' measurements of its surrounding cells compared to the measurements of its serving cell. Thus, the UEs that are active in cell A can make measurements of the strengths of the signals received from other cells. A total interference picture for a cell can also be generated, by summing up the interferences from the different cells in a weighted manner (the algorithm for generating this picture can easily be derived from the related algorithm used in the Inter Cell Dependency Matrix (ICDM) used in GSM networks).

The radio map is frequently updated from UE measurements. The essential part of the measurement is, as described in 3GPP standards, the Reference Signal Received Power (RSRP) from the surrounding cells. In principle, RSRP is determined for a considered cell as the linear average over the power contributions (in [W]) of the resource elements that carry cell-specific reference signals within the considered measurement frequency bandwidth. The measurements are performed separately per sub-carrier, but are combined by the UE before they are reported to the system.

There are two possibilities to collect measurements. The first possibility is to use the handover measurements that are triggered in handover situations, and the other possibility is to use forced measurements, ordered specifically for the purpose of creation of the radio map. Either or both of these two types of measurement could be used.

The UE measurements relating to one particular cell (that is, the measurements made in one cell indicating the strengths of signals transmitted from other cells), are reported to the Node B, or Radio Base Station (RBS) serving that cell. For efficiency, this Node B can use these UE measurements to aggregate its own, local, radio map. This map can then be sent up to the central node 40 where it is combined with other local maps sent by other Node Bs into one global radio map covering the whole network or a larger part of the network. It is also a possibility for the Node B to send the UE measurements up to the central node directly, and to create a global radio map there without first creating a local radio map.

The local or global radio map will consist of the UE measurements per cell relation. The data can then be compressed in different ways, for example as a flexible histogram (with a selected number of areas describing the measurements) or as a distribution (with numbers of samples within selected values). Which compression method to use, and how granular, can then be decided from resources available for radio map computation and memory. Depending on the compression method, there are also different possibilities as to how the data can be used.

Figure 3:
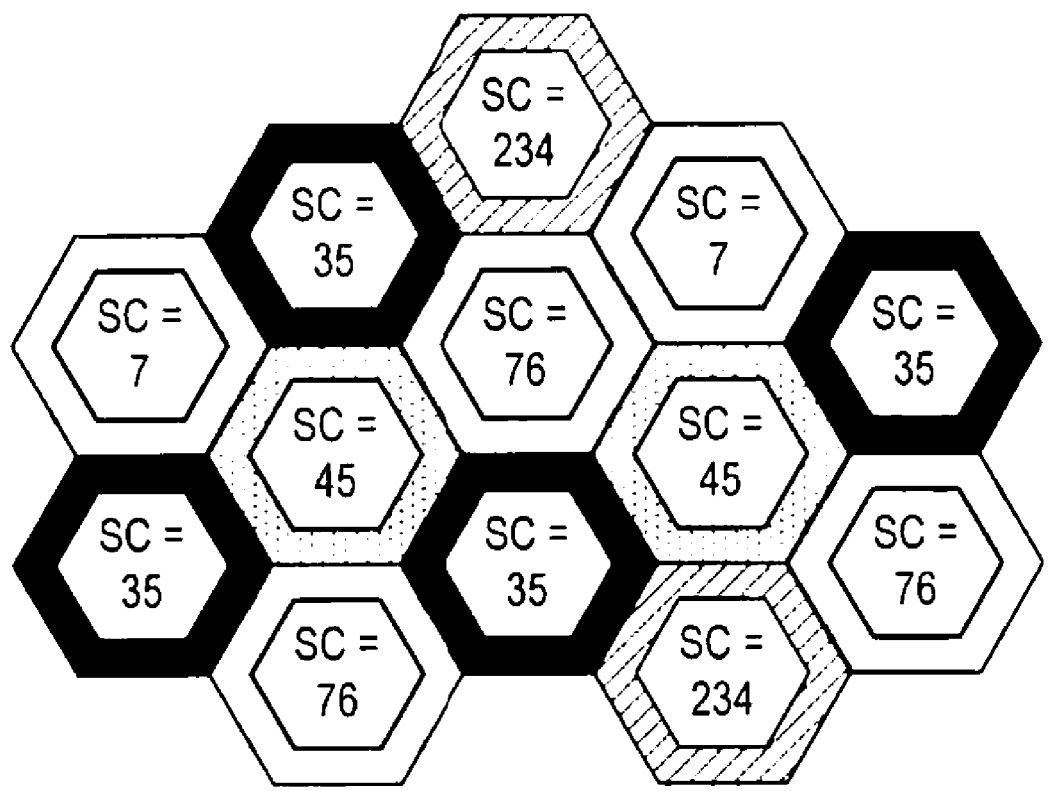
FIG. 3 is a map showing the distribution of scrambling codes in a schematically represented cellular network.

In step 52 of the method illustrated in FIG. 2, a cell of the network is identified. The scrambling code of this cell is known, as the management node 40 knows the scrambling code in each cell. As an example, FIG. 3 is a map showing the distribution of scrambling codes in a schematically represented cellular network. In this example, the cells are represented by regular hexagons, and only one scrambling code is in use in each cell, with scrambling codes 7, 35, 45, 76 and 234 being the only scrambling codes being used in this part of the network.

In step 54, another cell is identified, having the same scrambling code as the cell selected in step 52.

In step 56, the mutual potential interference is calculated, for the two cells identified in steps 52 and 54. The mutual potential interference is obtained from the radio map, as described above. It is then determined whether the mutual potential interference exceeds a threshold value that is set specifically for scrambling code clashes.

If the mutual potential interference does not exceed this threshold value, the process returns to consider other cells that have the same scrambling code as the first identified cell, and then to consider other cells having different scrambling codes.

If it is determined in step 56 that the mutual potential interference exceeds the threshold value, the process passes to step 58, in which an alternative scrambling code is proposed for one of the cells.

In one illustrated embodiment, the process for proposing an alternative scrambling code comprises, for each of the two cells identified in steps 52 and 54, generating a list showing all of the available scrambling codes and their interference levels in that cell. That is, for each cell there is generated a list of all of the scrambling codes, showing the amount of interference that would occur if the cell were instead transmitting using that scrambling code.

Comparing the two lists, it is then proposed that the cell that has the least interfered scrambling code in its list should have that least interfered scrambling code assigned as its new scrambling code. The best situation is where this new scrambling code is one that is not used at all elsewhere. This proposed scrambling code change can either be implemented automatically, or can be proposed to the network operator in a way so that the operator has the option to accept the change.

The procedure is then repeated for each combination of cells with the same scrambling code, one at a time. It is important that only one change where a certain scrambling code is involved (as original or new scrambling code) is done at a time, since the list of interfered scrambling codes needs to be regenerated in between. Thus, if using the open loop, where the user gets to accept the change, this can become time-consuming for the operator.

Although the process of FIG. 2 is described as being performed in the management node, it is also possible that the steps could be performed locally, for example in the RBS in a LTE network or in the RNC in a WCDMA network. Where the local node has established its local radio map, and is provided with information about other scrambling codes in use, the local node can also determine whether its current scrambling code (or other physical cell identity) is causing interference with another cell, and can then select an alternative scrambling code (or other physical cell identity) to reduce this interference.

There is thus described a system for reducing the possibility of a scrambling code collision between neighbour cells, and hence for improving the probability that a user equipment can successfully detect signals intended for it.

The invention claimed is:

1. A method of operation of a cellular wireless communications network, the method comprising, in respect of a cell of the cellular wireless communications network:

receiving measurements from a plurality of user equipments relating to reference signal received powers from a plurality of other cells of the cellular wireless communications network;

for at least one cell of the plurality of said other cells of the cellular wireless communications network having a physical cell identity that is the same as a physical cell identity of said cell, determining based on said received measurements whether the at least one cell is a potentially interfering cell if a mutual potential interference level with said cell exceeds a threshold; and in the event that the mutual potential interference level between the cell and the potentially interfering cell exceeds the threshold:

for the cell, generating a first list of physical cell identities available in the cellular wireless communications network;

for the potentially interfering cell, generating a second list of physical cell identities available in the cellular wireless communications network;

identifying an alternative physical cell identity from said first and second lists that would cause a lowest mutual potential interference level of a) interference between the cell and another cell already using that alternative physical cell identity, and b) interference between the potentially interfering cell and said another cell, and if the lowest mutual potential interference level is lower than the mutual potential interference level between the cell and the potentially interfering cell, selecting said alternative physical cell identity as a new physical cell identity for the cell or the potentially interfering cell.

2. A method as claimed in claim 1, wherein the method is performed in a base station serving said cell.

3. A method as claimed in claim 1, wherein the method is performed in a management node of the cellular wireless communications network.

4. A method as claimed in claim 1, wherein the reference signal received powers each comprise the linear average of the power contributions over a plurality of resource elements that carry cell-specific reference signals within a predetermined bandwidth.

5. A method as claimed in claim 1, comprising sending an instruction to a user equipment to make said measurements.

6. A method as claimed in claim 1, comprising receiving said measurements made by said user equipments in handover situations.

7. A method as claimed in claim 1, wherein the physical cell identity is a scrambling code.

8. A method as claimed in claim 1, wherein the physical cell identity is a base station identity code.

9. A method as claimed in claim 1, wherein the physical cell identity is a measured cell identity.

10. A network node of a cellular wireless communications network, the network node being adapted to receive from a cell of the cellular wireless communications network measurements from a plurality of user equipments relating to reference signal received powers from a plurality of other cells of the cellular wireless communications network;

and being further adapted to:

identify at least one cell of the plurality of said other cells in the cellular wireless communications network having a physical cell identity that is the same as a physical cell identity of said cell, and to determine based on said received measurements whether the at least one cell is a potentially interfering cell if a mutual potential interference level with said cell exceeds a threshold; and being further adapted, in the event that the mutual potential interference level between the cell and the potentially interfering cell exceeds the threshold, to:

for the cell, generate a first list of physical cell identities available in the cellular wireless communications network;

for the potentially interfering cell, generate a second list of physical cell identities available in the cellular wireless communications network;

identify an alternative physical cell identity from said first and second lists that would cause a lowest mutual potential interference level of a) interference between the cell and another cell already using that alternative physical cell identity, and b) interference between the potentially interfering cell and said another cell, and if said lowest mutual potential interference level is lower than the mutual potential interference level between the cell and the potentially interfering cell, select said alternative physical cell identity as a new physical cell identity for the cell or the potentially interfering cell.

11. A network node as claimed in claim 10, wherein the reference signal received powers each comprise the linear average of the power contributions over a plurality of resource elements that carry cell-specific reference signals within a predetermined bandwidth.

12. A network node as claimed in claim 10, wherein the physical cell identity is a scrambling code.

13. A network node as claimed in claim 10, wherein the physical cell identity is a base station identity code.

14. A network node as claimed in claim 10, wherein the physical cell identity is a measured cell identity.

* * * * *